(12) United States Patent
Liu et al.

(10) Patent No.: US 10,131,840 B2
(45) Date of Patent: Nov. 20, 2018

(54) METHOD FOR PREPARING IRON SILICON SULFUR MULTI-ELEMENT COMPOSITE BIOCHAR SOIL HEAVY METAL CONDITIONER

(71) Applicant: GUANGDONG INSTITUTE OF ECO-ENVIRONMENTAL SCIENCE & TECHNOLOGY, Guangzhou, Guangdong (CN)

(72) Inventors: Chuanping Liu, Guangzhou (CN); Fangbai Li, Guangzhou (CN); Xiangqin Wang, Guangzhou (CN)

(73) Assignee: GUANGDONG INSTITUTE OF ECO-ENVIRONMENTAL SCIENCE & TECHNOLOGY, Guangzhou (CN)

( * ) Notice: Subject to any disclaimer, the term of this patent is extended or adjusted under 35 U.S.C. 154(b) by 0 days.

(21) Appl. No.: 15/957,781

(22) Filed: Apr. 19, 2018

(65) Prior Publication Data
US 2018/0237692 A1    Aug. 23, 2018

Related U.S. Application Data

(63) Continuation of application No. PCT/CN2016/079110, filed on Apr. 12, 2016.

(30) Foreign Application Priority Data

Mar. 1, 2016  (CN) .......................... 2016 1 0115576

(51) Int. Cl.
| | |
|---|---|
| C09K 17/12 | (2006.01) |
| C09K 17/40 | (2006.01) |
| C09K 17/04 | (2006.01) |
| C09K 101/00 | (2006.01) |

(52) U.S. Cl.
CPC ............. *C09K 17/12* (2013.01); *C09K 17/04* (2013.01); *C09K 17/40* (2013.01); *C09K 2101/00* (2013.01)

(58) Field of Classification Search
CPC ......... C09K 17/12; C09K 17/04; C09K 17/40
USPC ....................................................... 588/313
See application file for complete search history.

(56) References Cited

FOREIGN PATENT DOCUMENTS

| | | | |
|---|---|---|---|
| CN | 103212365 | A | 7/2013 |
| CN | 103436265 | A | 12/2013 |
| CN | 104289185 | A | 1/2015 |
| CN | 104388094 | A | 3/2015 |
| CN | 104726104 | A | 6/2015 |
| CN | 104971938 | A | 10/2015 |
| WO | 2013/126477 | A1 | 8/2013 |

OTHER PUBLICATIONS

Wang et al.,"Arsenic Binding to Iron{II} Minerals Produced by an Iron(III)—Reducing Aeromonas Strain Isolated from Paddy Soil," Environmental Toxicology and Chemistry, 2009, vol. 28, No. 11, pp. 2255-2262.
Zhao, Qiguo, "Red Soil Matter Circulation and its Regulation," 2002.
Borch et al., "Biogeochemical Redox Processes and their Impact on Contaminant Dynamics," Environmental Science & Technology, 2010, vol. 44, No. 1, pp. 15-23.
Epstein, Emanuel, "The anomaly of silicon in plant biology," Proc. Natl. Acad. Sci. USA, Jan. 1994, vol. 91, pp. 11-17.
Zheng et al., "The effects of biochars from rice residue on the formation of iron plaque and the accumulation of Cd, Zn, Pb, As in rice (*Oryza sativa* L) seedlings," Chemosphere, 2012, vol. 89, pp. 856-862.
Jiang et al., "Phosphorus Adsorption by and Forms in Fe-modified Biochar," Journal of Agro-Environmental Science, 2014, vol. 33, No. 9, pp. 1817-1822.
Dec. 7, 2016 International Search Report issued in International Patent Application No. PCT/CN2016/079110.

*Primary Examiner* — Edward M Johnson
(74) *Attorney, Agent, or Firm* — Oliff PLC

(57) ABSTRACT

A method for preparing an iron silicon sulfur multi-element composite biochar soil heavy metal conditioner, including: adding silicate to agricultural wastes and roasting with air isolated to enable silicate to enter structural pores of biochar; enabling iron-containing slats to gather on kaolinite with a given proportion; enabling sulfate to gather on bentonite with a given proportion; mixing the above three materials evenly according to a given proportion; and adding diatomite and starch to the mixture, and pelleting to prepare the iron silicon sulfur multi-element composite biochar soil heavy metal conditioner. The conditioner can be widely applied in soil heavy metal pollution abatement of rice fields, and it is able to synchronously passivate composite pollutants in acid or alkaline soils to reduce the amount of pollutants absorbed by and accumulated in rice, thereby achieving safe utilization of polluted farmland.

16 Claims, 1 Drawing Sheet

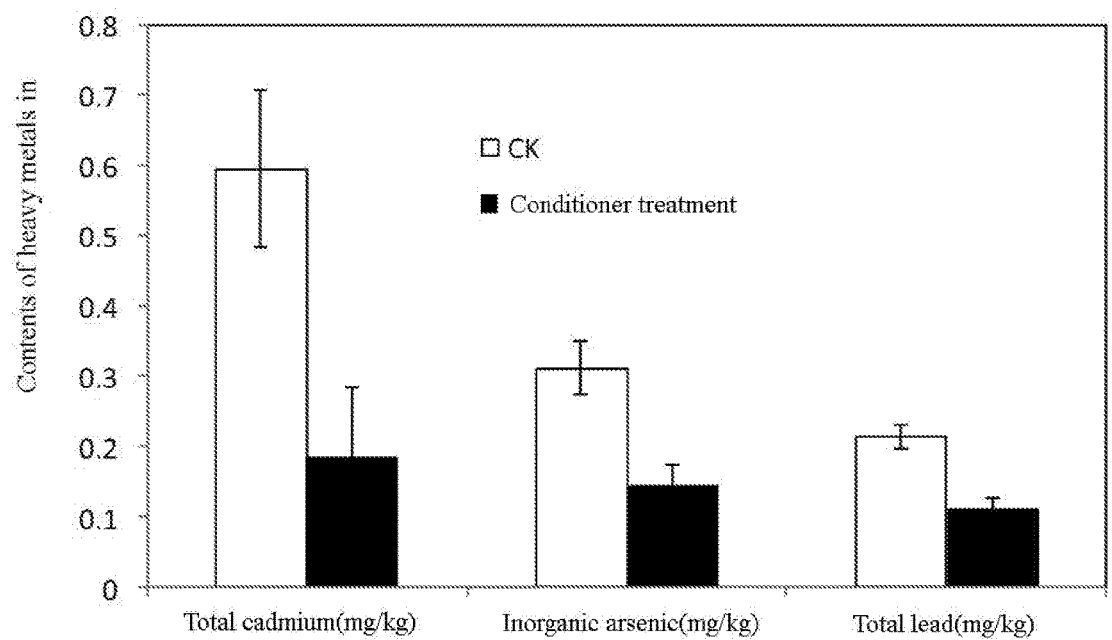

METHOD FOR PREPARING IRON SILICON SULFUR MULTI-ELEMENT COMPOSITE BIOCHAR SOIL HEAVY METAL CONDITIONER

This is a Continuation of International Patent Application No. PCT/CN2016/079110 filed Apr. 12, 2016, which claims the benefit Chinese Patent Application No. 201610115576.1 filed Mar. 1, 2016. The disclosure of the prior applications is hereby incorporated by reference herein in its entirety.

FIELD OF THE INVENTION

The present invention particularly relates to a method for preparing an iron silicon sulfur multi-element composite biochar soil heavy metal conditioner.

BACKGROUND OF THE INVENTION

How to effectively control and mitigate the pollution and hazard of heavy metals in soils is an increasingly serious international problem, which is especially prominent in our country. In particular, it is difficult to find a low-cost, broad-spectrum and practical technical method for treating large-scale heavy-metal polluted farmland soils. Besides, it is especially difficult for treating heavy metal composite pollutants in farmland. For example, arsenic and cadmium composite pollutants, compared to a single pollutant, result in more complex environmental effects due to their interaction, and are more difficult to be treated. Increasing the pH of soil can effectively reduce the bioavailability of cadmium in soil and the content of cadmium in rice, but may increase the activity of As in soil. Moreover, flooding can reduce the content of Cd in rice, but increase the content of As in rice. Therefore, how to control the soil process and manage water and fertilizer under the condition of As/Cd composite pollution is very complicated.

In recent years, the technology of passivating heavy metal pollutants in farmland has received more and more attention. A soil-friendly conditioner is applied to passivate heavy metals in polluted soil and reduce the absorption of heavy metals by crops, thus realizing simultaneous control and use of the agricultural soil polluted by heavy metals, which is a new economical and safe idea of prevention and control of heavy metal pollution in soil. The soil heavy-metal passivation technology has relatively low investment, high repair efficiency, and simple operation; it has superiority for repairing soils polluted by heavy metals at a medium/low level, and can meet the current demand of our country for controlling heavy metal pollution of farmland soil and ensuring safety of agricultural products. Commonly used soil heavy-metal passivators include the following substances: lime, calcium carbonate, fly ash and other alkaline substances; hydroxyapatite, ground phosphorite, calcium hydrogen phosphate and other phosphates; natural or modified zeolite, bentonite and other minerals; blast furnace slag, slag and other silicon-containing fertilizers; and peat, farmyard manure, green manure, bio-organic carbon and other organic fertilizers. These passivators often have a good passivation effect on heavy metal pollution in soil. However, the heavy metal pollution of soil is often composite pollution resulted from coexistence of two or more kinds of metals. Different heavy metal ions have different physical and chemical properties, and their migration in the soil and their environmental behavior are also quite different. Using a single soil passivator to repair multi-metal polluted soils is often challenging, and it is difficult to find a single substance that can reduce the mobility of all heavy metal ions. At present, therefore, the passivation of soil is mainly focused on passivation of a single heavy metal element, and composite additives or a variety of repair methods are usually simultaneously used for multi-metal composite pollution. If a multi-functional heavy-metal passivation material that can passivate multiple pollutants at the same time can be prepared, it will inevitably reduce the repair cost and improve the repair efficiency.

The toxicity and bioavailability of heavy metals in soil are not only related to the total amount of heavy metals, but also mainly affected by the physical and chemical properties of the soil. Iron oxides in soil are the key factors that control the morphological transformation and bioavailability of heavy metals in the soil. Iron is the most important redox active element in red soils (Wang et al., 2009) with a geochemical abundance of 5.1%, ranking fourth (Zhao Qiguo, 2002); iron is trapped in the surface of soil particles mainly in the form of free iron oxides, having high geochemical activity; it directly affects many soil processes (Borch et al., 2010). Iron oxides and other iron minerals, due to their very large specific surface area, chemical activity and morphological transformation, have higher adsorption capacity for a large number of heavy metals and oxygen-containing anions (such as $PO_4^{3-}$, $AsO_4^{3-}$, $CrO_4^{2-}$, etc.), and are often used as treatment agents for wastewater polluted by arsenic, chromium and other heavy metals. However, because iron and its oxides are easy to aggregate, they combine with the elements Mg, P, Ca and S in soils and affect their chemical properties, which hinders the application of iron and its oxides in the repair of heavy-metal polluted soils.

Sulfur in soils plays an important role in controlling the activity and bioavailability of heavy metals. $SO_4^{2-}$ entering the soil is quickly reduced to $S^{2-}$ under anaerobic conditions, with $S^{2-}$ forming sulfides with metal ions to stabilize heavy metals; $SO_4^{2-}$ generated by organosulfur mineralization of the soil and $SO_4^{2-}$ entering the soil due to atmospheric deposition and fertilization are rapidly reduced to $S^{2-}$ under anaerobic conditions, with $S^{2-}$ forming sulfides with metal ions. Metal sulfides in anaerobic soils are stable and insoluble, and have a significant impact on the concentration of heavy metal ions in soil pore water. In paddy fields, therefore, the application of sulfur-containing fertilizers, especially at the rice seedling stage, plays a very important role in stabilizing heavy metals in soils. However, when sulfur is oxidized in the soil to form $SO_4^{2-}$, a lot of $H^+$ is generated, resulting in the activation of heavy metals. Therefore, the application of sulfur-containing fertilizers alone has the risk of reactivating heavy metals in the later stage of rice growth. If the sulfur-containing fertilizers are applied together with other soil conditioners to avoid oxidation again, the passivation effect and application scope of sulfur-containing passivators for heavy metal cadmium will be inevitably increased.

Silicate fertilizer can reduce the availability of heavy metals in soil and inhibit the absorption and accumulation of heavy metals by crops. In recent years, studies have shown that silicon can increase resistance of plants to heavy metal toxicity, and is easy to use and cheap, thus having attracted people's attention. The current research has shown that the application of silicon fertilizer can increase the resistance of plants such as rice to heavy metals such as manganese, iron, cadmium and aluminum, and reduce the absorption and accumulation of these heavy metals by plants such as rice. Although the total content of Si in soil is very high, Si exists in the form of silicate; the silicon that plant can absorb and use is monosilicic acid (Si(OH)$_4$), and so the content of effective silicon in soil is often very low. The content of silicic acid in soil solution is typically 0.1-0.6 mM (Epstein, 1994). With the development of intensified agriculture, long-term continuous cropping of crops (especially gramineous plants such as rice) will result in continuous absorption of the effective Si from the soil, leading to a reduction of crops. Due to the strong desiliconization in the red soil area, the content of the effective silicon in the soil tends to be lower. Therefore, the role of silicon fertilizer in agricultural production has drawn more and more attention. However, most of the current silicon fertilizers come from blast furnace slag, silicon-bearing ores and the like, and the silicon in these silicon fertilizers is less effective. Silicic acid and other silicon-containing salts, once applied to the soil, are also easily fixed by soil minerals.

Biochar is a new type of material, and is a product of pyrolysis of biomass under hypoxic conditions. Biochar, whose particles are small, finely distributed, and light in weight, is a black porous solid, and is mainly composed of carbon, oxygen and other elements, with the carbon content therein generally above 70%. Biochar can be prepared from a wide range of raw materials, such as sawdust, straw, industrial organic waste, municipal sludge, palm filaments, coconut filaments, etc. Biochar is characterized by loose porous structure, large specific surface area, a lot of negative charge on the surface and so on, which make biochar have good adsorption properties. As a soil structure improver or a repair agent for soil pollution, biochar can improve the pH value of acidic soil and increase the cation exchange capacity, thus adsorbing the pollutants and heavy metals in the soil, reducing the accumulation of Cd, Pb and Zn in the crop body, accelerating the microbial metabolism and improving the microbial biomass of the soil, thereby enhancing the soil fertility, increasing the output of rice and other crops, and improving the quality of agricultural products. However, mobility of As increases with the pH of soil and As tends to bond to oxides and hydroxides of Fe, Al and Mn that have anion exchange sites in the soil, which mean that adding biochar to the soil does not necessarily control the bioavailability of As. Zheng et al. found that when biochar was applied to paddy soil polluted by heavy metals, biochar promoted the formation of iron film in paddy soil, which affected the migration of Cd, Zn, Pb and As in the soil, with the concentrations of Cd, Zn and Pb in rice roots decreased by 98%, 83% and 72%, respectively, while the concentration of As increased by 327%. Most farmland soil pollution is heavy-metal composite pollution, which poses a challenge to passivation of heavy metals in farmland by biochar.

The above iron oxides, sulfates, silicates and biochar have been widely used in heavy metal passivation of soil. They each have a good passivation effect on certain heavy-metal polluted soil under specific soil conditions. For example, iron oxides have a good effect on the passivation of arsenic-polluted soil, biochar has a special effect on the passivation of cadmium-polluted acid soil, and sulfates and silicates have good passivation effects on Cd or Pb pollution of acid soil. However, under the condition of heavy metal composite pollution of soils, the application of one of the above-mentioned conditioners alone often cannot achieve the goal of simultaneously passivating various heavy metals, and two or more passivators need to be applied at the same time. This causes not only inconvenience to the application, but also the phenomenon that iron oxides, sulfates and silicates tend to react chemically, resulting in loss or decrease of the passivation effect.

CONTENTS OF THE INVENTION

In order to solve the shortcomings and deficiencies of the prior art, the primary purpose of the present invention is to provide a method for preparing an iron silicon sulfur multi-element composite biochar soil heavy metal conditioner.

In the process of preparing biochar of the present invention, adding silicate to agricultural wastes such as plant stalk and roasting with air isolated to enable silicate to enter structural pores of biochar; enabling iron-containing slats to gather on kaolinite with a given proportion; enabling sulfate to gather on bentonite with a given proportion; mixing the above three materials evenly according to a given proportion; and adding diatomite and starch to the mixture, and pelleting to prepare an iron silicon sulfur multi-element composite biochar soil heavy metal conditioner. By using the conditioner, the purpose of synchronous passivation of multi-heavy metal composite pollutants under acidic or alkaline soil conditions can be achieved by the passivation effect of various effective components on various heavy metals; the purpose of synchronous passivation of composite pollutants of cadmium, arsenic, lead and so on in farmland can be achieved, so as to realize the goal of both heavy metal passivation and safe agricultural production, and significantly improve the current situations of abandoned agricultural soil and excessive heavy metal content in cultivated agricultural products caused by heavy metal pollution in our country.

Another purpose of the present invention is to provide an iron silicon sulfur multi-element composite biochar soil heavy metal conditioner prepared by the above method.

The purposes of the present invention are achieved by the following technical solution:

A method for preparing an iron silicon sulfur multi-element composite biochar soil heavy metal conditioner is provided, comprising the following steps:

(1) Preparation of silicate-containing biochar:

after mixing biomass with a certain amount of silicate or silicic acid, quickly increasing the temperature to 350° C.-550° C. by 10° C.-25° C. per minute with air isolated and maintaining this temperature for 5-10 h, and then cooling to room temperature with air kept isolated to obtain the silicate-containing biochar;

(2) preparation of adsorptive iron-containing kaolinite:

fully dissolving an iron-containing compound in water to obtain an iron-containing solution with iron content by mass of 5% to saturation, slowly spraying the iron-containing solution onto a certain mass of kaolinite while stirring the solution, and continuing stirring for 30-60 min after completely spraying the iron-containing solution; then drying to obtain the adsorptive iron-containing kaolinite;

(3) preparation of adsorptive sulfur-containing bentonite:

fully dissolving a sulfur-containing compound in water to obtain a sulfur-containing solution with sulfur content by mass of 5% to saturation, slowly spraying the sulfur-containing solution onto a certain mass of bentonite while stirring the solution, and continuing stirring for 30-60 min after completely spraying the sulfur-containing solution; then drying to obtain the adsorptive sulfur-containing bentonite;

(4) preparation of an iron silicon sulfur multi-element composite biochar soil heavy metal conditioner precursor:

fully mixing the materials prepared in the above steps (1), (2) and (3) according to parts by mass of 20:1:1-20:5:5, and pulverizing them to pass through a 60-mesh sieve and above to obtain the soil conditioner precursor; and (5) well mixing the soil conditioner precursor prepared in the step (4), diatomite and starch according to parts by mass of 100:1:2-100:5:10, spraying a suitable amount of water for pelleting, and drying to obtain the iron silicon sulfur multi-element composite biochar soil heavy metal conditioner.

In the step (1), the biomass may be either plant stalks such as rice straw, soybean straw, corn stalk and wheat stalk, or agricultural wastes such as palm filaments and palm shells or a mixture thereof; the silicate may be potassium silicate, sodium silicate and the like or a mixture thereof, preferably potassium silicate; the resulting silicate-containing biochar requires a fixed carbon content of greater than 60%, a pH of 911, and a mass ratio of biochar to silicon of 100:1-100:10, preferably 100:3-100:7.

In the step (2), the iron-containing compound may be ferric chloride, ferrous chloride, ferric nitrate, ferrous nitrate, ferric sulfate and ferrous sulfate or a mixture thereof, preferably ferrous nitrate; the volumetric mass ratio of the iron-containing solution to kaolinite is controlled at 5:1-5:10 mL/g, preferably 5:2.5 mL/g.

In the step (3), the sulfur-containing compound may be sodium sulfate, potassium sulfate, magnesium sulfate, sodium thiosulfate and potassium thiosulfate or a mixture thereof, preferably potassium sulfate; the volumetric mass ratio of the sulfur-containing solution to bentonite is controlled at 5:1-5:10 mL/g, preferably 5:2.5 mL/g.

The present invention also provides an iron silicon sulfur multi-element composite biochar soil heavy metal conditioner prepared by the above method, with the particle size at 3.5-5.5 mm The present invention has the following advantages and benefits compared to the prior art:

(1) The soil heavy metal conditioner prepared by the present invention contains iron oxide, sulfate, silicate, biochar and other effective components, and is a soil conditioner with the synergistic effect of multiple elements, having passivation function on a variety of heavy metals such as arsenic, cadmium and lead in the soil; it can be used for the heavy-metal composite pollution of soil.

(2) The soil conditioner of the present invention, utilizing the macromolecular structure of biochar as a carrier for the soil heavy metal conditioner, overcomes the shortcomings that iron oxides, sulfates and silicates will have chemical reactions after being mixed and thus will lose or reduce their respective passivation of heavy metals in the soil, and can have good passivation effects on the heavy metal composite pollution of acidic and alkaline soils; besides, biochar is not easily degraded in the soil, and so the conditioner is more economical and effective for soil heavy metal passivation.

(3) The materials of the present invention have a wide range of sources and are cheap and easily obtainable; the production process is simple and easy to be implemented in a large-scale factory.

BRIEF DESCRIPTION OF THE DRAWINGS

FIG. 1 shows the effects of the conditioner on the contents of heavy metals As, Cd and Pb in brown rice in a field test.

DETAILED DESCRIPTION OF THE EMBODIMENTS

The present invention will be further described below in detail with reference to examples and drawings; however, the embodiments of the present invention are not limited thereto.

EXAMPLE 1: A method 1 for preparing the iron silicon sulfur multi-element composite biochar soil heavy metal conditioner comprises the following steps:

Fully mixing dry palm filaments and potassium silicate according to certain parts by mass, quickly increasing the temperature to 450° C. by 20° C. per minute with air isolated and maintaining this temperature for 8 h, and then cooling to room temperature with air kept isolated to obtain the silicate-containing biochar; the resulting biochar has a fixed carbon content of 69.6% and a pH of 10.14, with the parts by mass of palm filaments and potassium silicate adjusted to control the mass ratio of biochar to silicon at 100:5.

Fully dissolving ferrous nitrate in water to prepare an iron-containing solution with an iron mass fraction of 10%, slowly spraying the iron-containing solution onto kaolinite while stirring according to a volumetric mass ratio of 5:2.5 mL/g, continuing stirring for 60 min after completely spraying the iron-containing solution, and well stirring and drying to obtain the iron-adsorbing kaolinite.

Fully dissolving potassium sulfate in water to prepare a sulfur-containing solution with a sulfur mass fraction of 10%, slowly spraying the sulfur-containing solution onto bentonite while stirring according to a volumetric mass ratio of 5:2.5 mL/g, continuing stirring for 60 min after completely spraying the sulfur-containing solution, and well stirring and drying to obtain the sulfur-adsorbing bentonite.

Fully mixing the above silicate-containing biochar, iron-adsorbing kaolinite and sulfur-adsorbing bentonite according to parts by mass of 20:2.5:2.5, pulverizing them to pass through a 60-mesh sieve and above, weighing 100 parts by mass of the sieved materials, 2.5 parts by mass of diatomite, and 5 parts by mass of starch and well mixing them, spraying a suitable amount of water for pelleting, and drying to obtain the iron silicon sulfur multi-element composite biochar soil heavy metal conditioner; the particle size of the conditioner is 4.0±0.5 mm EXAMPLE 2: A method 2 for preparing the iron silicon sulfur multi-element composite biochar soil heavy metal conditioner comprises the following steps:

Crushing the dried soybean straw into segments shorter than 5 cm, fully mixing them with sodium silicate according to certain parts by mass, quickly increasing the temperature to 350° C. by 10° C. per minute with air isolated and maintaining this temperature for 5 h, and then cooling to room temperature with air kept isolated to obtain the silicate-containing biochar; the resulting biochar has a fixed carbon content of 62.6% and a pH of 9.18, with the parts by mass of soybean straw and sodium metasilicate adjusted to control the mass ratio of biochar to silicon at 100:1.

Fully dissolving iron sulfate in water to prepare an iron-containing solution with an iron mass fraction of 5%, slowly spraying the iron-containing solution onto kaolinite while stirring according to a volumetric mass ratio of 5:1 mL/g, continuing stirring for 30 min after completely spraying the iron-containing solution, and well stirring and drying to obtain the iron-adsorbing kaolinite.

Fully dissolving magnesium sulfate in water to prepare a sulfur-containing solution with a sulfur mass fraction of 5%, slowly spraying the sulfur-containing solution onto bentonite while stirring according to a volumetric mass ratio of 5:1 mL/g, continuing stirring for 30 min after completely spraying the sulfur-containing solution, and well stirring and drying to obtain the sulfur-adsorbing bentonite.

Fully mixing the above silicate-containing biochar, iron-adsorbing kaolinite and sulfur-adsorbing bentonite according to parts by mass of 20:1:1, pulverizing them to pass through a 60-mesh sieve and above, weighing 100 parts by mass of the sieved materials, 1 part by mass of diatomite, and 2 parts by mass of starch and well mixing them, spraying a suitable amount of water for pelleting, and drying to obtain the iron silicon sulfur multi-element composite biochar soil heavy metal conditioner; the particle size of the conditioner is 4.5±0.5 mm EXAMPLE 3: A method 3 for preparing the iron silicon sulfur multi-element composite biochar soil heavy metal conditioner comprises the following steps:

Crushing the dried rice straw into segments shorter than 5 cm, fully mixing them with silicic acid according to certain parts by mass, quickly increasing the temperature to 550° C. by 25° C. per minute with air isolated and maintaining this temperature for 10 h, and then cooling to room temperature with air kept isolated to obtain the silicate-containing biochar; the resulting biochar has a fixed carbon content of 78.9% and a pH of 10.78, with the parts by mass of rice straw and metasilicic acid adjusted to control the mass ratio of biochar to silicon at 100:5.

Fully dissolving ferrous chloride in water to prepare an iron-containing solution with an iron mass fraction of 15%, slowly spraying the iron-containing solution onto kaolinite while stirring according to a volumetric mass ratio of 5:10 mL/g, continuing stirring for 60 min after completely spraying the iron-containing solution, and well stirring and drying to obtain the iron-adsorbing kaolinite.

Fully dissolving sodium thiosulfate in water to prepare a sulfur-containing solution with a sulfur mass fraction of 15%, slowly spraying the sulfur-containing solution onto bentonite while stirring according to a volumetric mass ratio of 5:10 mL/g, continuing stirring for 60 min after completely spraying the sulfur-containing solution, and well stirring and drying to obtain the sulfur-adsorbing bentonite.

Fully mixing the above silicate-containing biochar, iron-adsorbing kaolinite and sulfur-adsorbing bentonite according to parts by mass of 20:5:5, pulverizing them to pass through a 60-mesh sieve and above, weighing 100 parts by mass of the sieved materials, 5 parts by mass of diatomite, and 10 parts by mass of starch and well mixing them, spraying a suitable amount of water for pelleting, and drying to obtain the iron silicon sulfur multi-element composite biochar soil heavy metal conditioner; the particle size of the conditioner is 3.5±0.5 mm EXAMPLE 4: A method 4 for preparing the iron silicon sulfur multi-element composite biochar soil heavy metal conditioner comprises the following specific steps:

Crushing the dried corn stalk into segments shorter than 5 cm, fully mixing them with potassium silicate and silicic acid according to certain parts by mass, quickly increasing the temperature to 500° C. by 20° C. per minute with air isolated and maintaining this temperature for 8 h, and then cooling to room temperature with air kept isolated to obtain the silicate-containing biochar; the resulting biochar has a fixed carbon content of 71.2% and a pH of 10.18, with the parts by mass of corn stalk and the mixture of potassium metasilicate and metasilicic acid adjusted to control the mass ratio of biochar to silicon at 100:3.

Fully dissolving the mixture of ferrous chloride and ferric nitrate in water to prepare an iron-containing solution with an iron mass fraction of 10%, slowly spraying the iron-containing solution onto kaolinite while stirring according to a volumetric mass ratio of 5:5 mL/g, continuing stirring for 40 min after completely spraying the iron-containing solution, and well stirring and drying to obtain the iron-adsorbing kaolinite.

Fully dissolving the mixture of sodium sulfate and potassium thiosulfate in water to prepare a sulfur-containing solution with a sulfur mass fraction of 10%, slowly spraying the sulfur-containing solution onto bentonite while stirring according to a volumetric mass ratio of 5:5 mL/g, continuing stirring for 40 min after completely spraying the sulfur-containing solution, and well stirring and drying to obtain the sulfur-adsorbing bentonite.

Fully mixing the above silicate-containing biochar, iron-adsorbing kaolinite and sulfur-adsorbing bentonite according to parts by mass of 20:3:5, pulverizing them to pass through a 60-mesh sieve and above, weighing 100 parts by mass of the sieved materials, 3 parts by mass of diatomite, and 8 parts by mass of starch and well mixing them, spraying a suitable amount of water for pelleting, and drying to obtain the iron silicon sulfur multi-element composite biochar soil heavy metal conditioner; the particle size of the conditioner is 3.5±0.5 mm EXAMPLE 5: Pot experiment on passivation effects of the soil conditioner on the heavy metal composite pollution of alkaline paddy soil The soil was collected from the surface layer of 0-20 cm of the farmland polluted by mining in Shangshe Village, Yanhong Town, Chenghai District, Shantou City, Guangdong Province; the soil was naturally dried and then passed through a sieve of 2 mm, having the basic physical and chemical properties as shown in Table 1. Weighing 10 kg of the soil from each pot and putting them into a plastic bucket (35 cm in diameter, and 40 cm in height), and treating them as follows: T1: 10 kg soil+100 g conditioner prepared in Example 1; T2: 10 kg soil+100 g conditioner prepared in Example 2; T3: 10 kg soil+100 g conditioner prepared in Example 3; T4: 10 kg soil+100 g conditioner prepared in Example 4; T5: 10 kg soil+75 g ordinary biochar; T6: 10 kg soil+5 g iron powder; T7: 10 kg soil+5 g potassium sulfate; T8: 10 kg soil+15 g potassium metasilicate; T9: 10 kg soil+5 g potassium sulfate+5 g iron powder; taking the one with no conditioner as a control (CK). There were 3 replicates for each treatment and placed in a glass greenhouse. Planting rice 5 days after application of various conditioners; collecting soil samples after 30 days of rice growth, analyzing the contents of the available heavy metals Cd, Pb and As in the soil samples; collecting rice samples at rice harvest, and analyzing the contents of Cd, Pb and As in grams.

As shown in Table 2, the contents of the available Cd and Pb in the potted paddy soil treated with different conditioners decreased to varying degrees; in addition to T5 (single application of ordinary biochar), the contents of the available As in the potted paddy soil treated with other conditioners also decreased to varying degrees. Among them, the contents of the available As, Cd and Pb in the soils treated with the conditioner prepared in Example 1 decreased the most by 65.0%, 59.8% and 54.8%, respectively. Moreover, the four conditioners prepared by the present invention were effective in passivation of As, Cd and Pb in the soils at the same time (the contents of the available As, Cd and Pb after the treatment of T1, T2, T3 and T4 were significantly lower than those of the control); application of biochar alone (T5) could only passivate Cd and Pb, application of iron powder alone (T6) could only effectively passivate As, treatment with sulfate alone (T7) did not work well on the passivation of the three heavy metals, treatment with silicate alone (T8) could passivate As, Cd and Pb simultaneously with the effect however not as good as that of the patented conditioner, while the iron and sulfur composite treatment (T9) could only passivate As. Correspondingly, the contents of inorganic As, total Cd and total Pb of the potted brown rice decreased significantly at the same time only after the application of the soil conditioner of the present invention (Table 3); among them, the contents of inorganic As, total Cd and total Pb in rice after the application of the conditioner prepared in Example 1 decreased the most by 52.1%, 58.6% and 42.1%, respectively. This shows that, compared with the common conditioner, the iron silicon sulfur multi-element composite biochar soil heavy metal conditioner prepared by the technology of the present invention can simultaneously and effectively passivate the As, Cd and Pb composite pollution of the soil and reduce the absorption and accumulation of the three heavy metals in rice.

TABLE 1

Basic physical and chemical properties of potted soil for test

| Test items | Results |
|---|---|
| pH | 7.47 |
| Total As (mg · kg$^{-1}$) | 248.6 |
| Total Cd (mg · kg$^{-1}$) | 2.01 |
| Total Pb (mg · kg$^{-1}$) | 102 |
| Cation exchange capacity (cmol · kg$^{-1}$) | 16.4 |
| TOC (g · kg$^{-1}$) | 26.4 |

TABLE 2

Effects of different conditioners on the contents of the available As, Cd and Pb in the potted soil

| | As | | Cd | | Pb | |
|---|---|---|---|---|---|---|
| | Content of available As (mg · kg$^{-1}$) | Declining proportion (%) | Content of available Cd (mg · kg$^{-1}$) | Declining proportion (%) | Content of available Pb (mg · kg$^{-1}$) | Declining proportion (%) |
| CK | 4.12 | | 0.102 | | 0.34 | |
| T1 | 1.44 | 65.0 | 0.041 | 59.8 | 0.15 | 54.8 |
| T2 | 2.56 | 37.9 | 0.065 | 36.3 | 0.18 | 48.4 |
| T3 | 2.15 | 47.8 | 0.058 | 43.1 | 0.23 | 33.1 |
| T4 | 2.09 | 49.3 | 0.052 | 49.0 | 0.23 | 32.0 |
| T5 | 7.16 | -73.8 | 0.074 | 27.5 | 0.25 | 25.5 |
| T6 | 2.53 | 38.6 | 0.092 | 9.8 | 0.33 | 3.6 |
| T7 | 4.02 | 2.4 | 0.098 | 3.9 | 0.34 | 0.4 |
| T8 | 2.89 | 29.9 | 0.067 | 34.3 | 0.30 | 13.0 |
| T9 | 3.37 | 18.2 | 0.098 | 4.1 | 0.32 | 6.9 |

TABLE 3

Effects of different conditioners on the contents of the available As, Cd and Pb in the potted brown rice

| | Inorganic As | | Total Cd | | Total Pb | |
|---|---|---|---|---|---|---|
| | Content of inorganic As (mg · kg$^{-1}$) | Declining proportion (%) | Cd content (mg · kg$^{-1}$) | Declining proportion (%) | Total Pb content (mg · kg$^{-1}$) | Declining proportion (%) |
| CK | 0.512 | | 0.456 | | 0.14 | |
| T1 | 0.245 | 52.1 | 0.189 | 58.6 | 0.081 | 42.1 |
| T2 | 0.340 | 33.5 | 0.302 | 33.7 | 0.083 | 40.7 |
| T3 | 0.307 | 40.1 | 0.271 | 40.5 | 0.096 | 31.2 |
| T4 | 0.291 | 43.2 | 0.247 | 45.8 | 0.098 | 30.1 |
| T5 | 0.846 | -65.3 | 0.255 | 44.1 | 0.108 | 22.7 |
| T6 | 0.343 | 33.1 | 0.407 | 10.7 | 0.129 | 7.8 |
| T7 | 0.494 | 3.5 | 0.425 | 6.7 | 0.136 | 3.2 |
| T8 | 0.397 | 22.4 | 0.311 | 31.8 | 0.119 | 14.7 |
| T9 | 0.432 | 15.6 | 0.423 | 7.2 | 0.129 | 7.8 |

EXAMPLE 6: Pot experiment on passivation effects of the soil conditioner on the heavy metal composite pollution of acidic paddy soil The soil was collected from the surface of 0-20 cm of the polluted farmland in Dongtang Town, Renhua County, Shaoguan City, Guangdong Province; the soil was naturally dried and then passed through a sieve of 2 mm, having the basic physical and chemical properties as shown in Table 4. Weighing 10 kg of the soil from each pot and putting them into a plastic bucket (35 cm in diameter, and 40 cm in height), and treating them as follows: T1: 10 kg soil+100 g conditioner prepared in Example 1; T2: 10 kg soil+100 g conditioner prepared in Example 2; T3: 10 kg soil+100 g conditioner prepared in Example 3; T4: 10 kg soil+100 g conditioner prepared in Example 4; T5: 10 kg soil+75 g ordinary biochar; T6: 10 kg soil+5 g iron powder; T7: 10 kg soil+5g potassium sulfate; T8: 10 kg soil+15 g potassium metasilicate; T9: 10 kg soil+5 g potassium sulfate+5 g iron powder; taking the one with no conditioner as a control (CK). There were 3 replicates for each treatment and placed in a glass greenhouse. Planting rice 5 days after application of various conditioners; collecting soil samples after 30 days of rice growth, analyzing the contents of available heavy metals Cd, Pb and As in the soil samples; collecting rice samples at rice harvest, and analyzing the contents of Cd, Pb and As in grains.

As shown in Table 5, the contents of the available Cd and Pb in the potted paddy soil treated with different conditioners decreased to varying degrees; in addition to T5 (single application of ordinary biochar), the contents of available As in the potted paddy soil treated with other conditioners also decreased to varying degrees. Among them, the contents of available As, Cd and Pb in the soils treated with the conditioner prepared in Example 1 decreased the most by 65.5%, 46.4% and 77.0%, respectively. Moreover, the four conditioners prepared by the present invention were effective in passivation of As, Cd and Pb in the soils at the same time (the contents of the available As, Cd and Pb after the treatment of T1, T2, T3 and T4 were significantly lower than those of the control); application of biochar alone (T5) could only passivate Cd and Pb, application of iron powder alone (T6) could only effectively passivate As, treatment with sulfate alone (T7) could only passivate Cd and Pb, treatment with silicate alone (T8) could only passivate As, while composite treatment with iron and sulfur (T9) could passivate As, Cd and Pb simultaneously with the effect however not as good as that of the conditioner of the present invention. Correspondingly, the contents of inorganic As, total Cd and total Pb of the potted brown rice decreased significantly at the same time only after the application of the soil conditioner of the present invention (Table 6); among them, the contents of inorganic As, total Cd and total Pb in rice after the application of the conditioner prepared in Example 1 decreased the most by 45.2%, 63.5% and 54.0%, respectively. According to the results of Example 5, compared with the common conditioner, the iron silicon sulfur multi-element composite biochar soil heavy metal conditioner prepared by the technology of the present invention, by being applied to the treatment of heavy metal pollution in acidic and alkaline paddy soils, can simultaneously and effectively passivate the As, Cd and Pb composite pollution of the soil, and reduce the absorption and accumulation of the three heavy metals in rice.

TABLE 4

Basic physical and chemical properties of potted soil for test

| Test indicator | Content |
|---|---|
| pH | 4.60 |
| Total As (mg · $kg^{-1}$) | 32.5 |
| Total Cd (mg $kg^{-1}$) | 2.19 |
| Total Pb (mg $kg^{-1}$) | 321 |
| Cation exchange capacity (cmol · $kg^{-1}$) | 18.3 |
| TOC (g · $kg^{-1}$) | 32.5 |

TABLE 5

Effects of different conditioners on the contents of the available As, Cd and Pb in the potted soil

| | As | | Cd | | Pb | |
|---|---|---|---|---|---|---|
| | Content of available As (mg · $kg^{-1}$) | Declining proportion (%) | Content of available Cd (mg · $kg^{-1}$) | Declining proportion (%) | Content of available Pb (mg · $kg^{-1}$) | Declining proportion (%) |
| CK | 2.96 | | 0.56 | | 4.21 | |
| T1 | 1.02 | 65.5 | 0.3 | 46.4 | 0.97 | 77.0 |
| T2 | 2.04 | 31.1 | 0.39 | 30.4 | 1.34 | 68.2 |
| T3 | 1.54 | 48.0 | 0.43 | 23.2 | 1.98 | 53.0 |
| T4 | 1.62 | 45.3 | 0.41 | 26.8 | 2.35 | 44.2 |
| T5 | 3.21 | −8.4 | 0.45 | 19.6 | 2.45 | 41.8 |
| T6 | 1.68 | 43.2 | 0.54 | 3.6 | 4.18 | 0.7 |
| T7 | 3.05 | −3.0 | 0.45 | 19.6 | 3.17 | 24.7 |
| T8 | 2.54 | 14.2 | 0.37 | 33.9 | 4.13 | 1.9 |
| T9 | 2.28 | 23.0 | 0.41 | 26.8 | 2.68 | 36.3 |

TABLE 6

Effects of different conditioners on the contents of the available As, Cd and Pb in the potted brown rice

| | Inorganic As | | Total Cd | | Total Pb | |
|---|---|---|---|---|---|---|
| | Content of inorganic As (mg · $kg^{-1}$) | Declining proportion (%) | Cd content (mg · $kg^{-1}$) | Declining proportion (%) | Total Pb content (mg · $kg^{-1}$) | Declining proportion (%) |
| CK | 0.321 | | 0.537 | | 0.341 | |
| T1 | 0.176 | 45.2 | 0.196 | 63.5 | 0.157 | 54.0 |
| T2 | 0.281 | 12.6 | 0.204 | 55.2 | 0.170 | 50.1 |
| T3 | 0.206 | 35.7 | 0.250 | 45.1 | 0.190 | 44.3 |
| T4 | 0.213 | 33.6 | 0.275 | 39.7 | 0.202 | 40.7 |
| T5 | 0.351 | −9.3 | 0.352 | 22.7 | 0.219 | 35.9 |
| T6 | 0.216 | 32.8 | 0.413 | 9.5 | 0.225 | 34.1 |
| T7 | 0.330 | −2.7 | 0.435 | 4.6 | 0.322 | 5.7 |
| T8 | 0.265 | 17.4 | 0.269 | 41.1 | 0.304 | 10.8 |
| T9 | 0.258 | 19.7 | 0.378 | 17.1 | 0.274 | 19.6 |

EXAMPLE 7: Field test on passivation effects of the soil conditioner on the heavy metal composite pollution of paddy soil The test site was located in a paddy field in Baisha Town, Qujiang District, Guangdong Province, with the paddy field polluted by composite As, Pb and Cd; the surface soil (0-30 cm) of this paddy field was collected and analyzed, having the basic physical and chemical properties as shown in Table 7. The test included the following treatments: (1) Blank control (CK); and (2) conditioner treatment: applying the soil conditioner of Example 1 at a rate of 150 kg/acre five days prior to rice transplanting. three replicates were provided for each treatment, and randomly arranged; there were totally six test regions, each region having an area of 5*64=30 $m^2$, so as to ensure independent irrigation and drainage. After rice is ripe, the content of heavy metals in brown rice was analyzed.

As shown in FIG. 1, application of the soil conditioner of 150 kg/acre under field conditions can effectively reduce contents of inorganic As, total Cd and total Pb in rice grown on paddy soils polluted by composite heavy metals. Compared with the control, the results show that inorganic As, total Cd and total Pb in brown rice decreased respectively from 0.321 mg/kg, 0.537 mg/kg and 0.341 mg/kg to 0.176 mg/kg, 0.196 mg/kg and 0.157 mg/kg after application of the soil conditioner of 150 kg/acre, decreased by 45.2%, 63.5% and 54.0% respectively; in addition, inorganic As, total Cd and total Pb in brown rice reached the food hygiene standards after application of the soil conditioner of 150 kg/acre. This shows that applying the soil conditioner prepared by the present invention can effectively passivate the heavy-metal composite pollution of the paddy soil, and reduce the absorption and accumulation of heavy metals in rice, thus allowing growth of qualified rice in the paddy soil with mild composite pollution.

TABLE 7

Basic physical and chemical properties of the soil for test

| Analysis item | Content/value | Analysis item | Content/value |
|---|---|---|---|
| All N/g · $kg^{-1}$ | 1.67 | All Pb/mg · $kg^{-1}$ | 162.8 |
| All P/mg · $kg^{-1}$ | 512 | All Cd/mg · $kg^{-1}$ | 2.96 |
| All K/mg · $kg^{-1}$ | 623 | Organic matter/ g · kg-1 | 16.2 |
| Fast-effective P/mg · $kg^{-1}$ | 37.8 | All As/mg · $kg^{-1}$ | 33.8 |
| Fast-effective K/mg · $kg^{-1}$ | 80.1 | Fast-effective N/mg · $kg^{-1}$ | 148 |
| pH | 4.59 | | |

The above examples are preferred embodiments of the present invention; however, the embodiments of the present invention are not limited thereto, and any other alteration, modification, substitution, combination and simplification made without departing from the spiritual essence and principle of the present invention are equivalent replacements and fall within the scope of protection of the present invention.

What is claimed is:

1. A method for preparing an iron silicon sulfur multi-element composite biochar soil heavy metal conditioner, wherein: this method comprises the following steps:
    (1) after mixing biomass with a certain amount of silicate or silicic acid, increasing the temperature to 350° C.-550° C. by 10° C.-25° C. per minute with air isolated and maintaining this temperature for 5-10 h, and then cooling to room temperature with air kept isolated to obtain silicate-containing biochar;
    (2) dissolving an iron-containing compound in water to obtain an iron-containing solution with iron content by mass of 5% to saturation, spraying the iron-containing solution onto a certain mass of kaolinite while stirring the solution, continuing stirring for 30-60 min after completely spraying the solution, and drying to obtain adsorptive iron-containing kaolinite;
    (3) dissolving a sulfur-containing compound in water to obtain a sulfur-containing solution with sulfur content by mass of 5% to saturation, spraying the sulfur-containing solution onto a certain mass of bentonite while stirring the solution, continuing stirring for 30-60 min after completely spraying the solution, and drying to obtain the adsorptive sulfur-containing bentonite;

(4) fully mixing the materials prepared in the above steps (1), (2) and (3) according to parts by mass of 20:1:1-20:5:5, pulverizing them to pass through a 60-mesh sieve and above to obtain the soil conditioner precursor; and (5) well mixing the soil conditioner precursor prepared in the step (4), diatomite and starch according to parts by mass of 100:1:2-100:5:10, spraying water for pelleting, and drying to obtain the iron silicon sulfur multi-element composite biochar soil heavy metal conditioner.

2. The method for preparing an iron silicon sulfur multi-element composite biochar soil heavy metal conditioner according to claim 1, wherein: in the step (1), the biomass is at least one of plant stalks, palm filaments and palm shells; the silicate is at least one of potassium silicate and sodium silicate; the resulting silicate-containing biochar has a fixed carbon content of greater than 60%, a pH of 911, and a mass ratio of biochar to silicon of 100:1-100:10.

3. The method for preparing an iron silicon sulfur multi-element composite biochar soil heavy metal conditioner according to claim 2, wherein: the plant stalks are at least one of rice straw, soybean stalks, corn stalks and wheat stalks.

4. The method for preparing an iron silicon sulfur multi-element composite biochar soil heavy metal conditioner according to claim 1, wherein: in the step (1), the silicate is potassium silicate; the obtained silicate-containing biochar has a mass ratio of biochar to silicon of 100:3-100:7.

5. The method for preparing an iron silicon sulfur multi-element composite biochar soil heavy metal conditioner according to claim 1, wherein: in the step (2), the iron-containing compound is at least one of ferric chloride, ferrous chloride, ferric nitrate, ferrous nitrate, ferric sulfate and ferrous sulfate; and the volumetric mass ratio of the iron-containing solution to kaolinite is controlled at 5:1-5:10 mL/g.

6. The method for preparing an iron silicon sulfur multi-element composite biochar soil heavy metal conditioner according to claim 1, wherein: in the step (2), the iron-containing compound is ferrous nitrate; and the volumetric mass ratio of the iron-containing solution to kaolinite is 5:2.5 mL/g.

7. The method for preparing an iron silicon sulfur multi-element composite biochar soil heavy metal conditioner according to claim 1, wherein: in the step (3), the sulfur-containing compound is at least one of sodium sulfate, potassium sulfate, magnesium sulfate, sodium thiosulfate and potassium thiosulfate; and the volumetric mass ratio of the sulfur-containing solution to bentonite is controlled at 5:1-5:10 mL/g.

8. The method for preparing an iron silicon sulfur multi-element composite biochar soil heavy metal conditioner according to claim 1, wherein: in the step (3), the sulfur-containing compound is potassium sulfate; and the volumetric mass ratio of the sulfur-containing solution to bentonite is 5:2.5 mL/g.

9. An iron silicon sulfur multi-element composite biochar soil heavy metal conditioner, wherein: it is prepared by the method for preparing an iron silicon sulfur multi-element composite biochar soil heavy metal conditioner according to claim 1, with its particle size at 3.5-5.5 mm.

10. An iron silicon sulfur multi-element composite biochar soil heavy metal conditioner, wherein: it is prepared by the method for preparing an iron silicon sulfur multi-element composite biochar soil heavy metal conditioner according to claim 2, with its particle size at 3.5-5.5 mm.

11. An iron silicon sulfur multi-element composite biochar soil heavy metal conditioner, wherein: it is prepared by the method for preparing an iron silicon sulfur multi-element composite biochar soil heavy metal conditioner according to claim 3, with its particle size at 3.5-5.5 mm.

12. An iron silicon sulfur multi-element composite biochar soil heavy metal conditioner, wherein: it is prepared by the method for preparing an iron silicon sulfur multi-element composite biochar soil heavy metal conditioner according to claim 4, with its particle size at 3.5-5.5 mm.

13. An iron silicon sulfur multi-element composite biochar soil heavy metal conditioner, wherein: it is prepared by the method for preparing an iron silicon sulfur multi-element composite biochar soil heavy metal conditioner according to claim 5, with its particle size at 3.5-5.5 mm.

14. An iron silicon sulfur multi-element composite biochar soil heavy metal conditioner, wherein: it is prepared by the method for preparing an iron silicon sulfur multi-element composite biochar soil heavy metal conditioner according to claim 6, with its particle size at 3.5-5.5 mm.

15. An iron silicon sulfur multi-element composite biochar soil heavy metal conditioner, wherein: it is prepared by the method for preparing an iron silicon sulfur multi-element composite biochar soil heavy metal conditioner according to claim 7, with its particle size at 3.5-5.5 mm.

16. An iron silicon sulfur multi-element composite biochar soil heavy metal conditioner, wherein: it is prepared by the method for preparing an iron silicon sulfur multi-element composite biochar soil heavy metal conditioner according to claim 8, with its particle size at 3.5-5.5 mm.

* * * * *